United States Patent [19]

Schröder

[11] 4,214,830
[45] Jul. 29, 1980

[54] CONDUCTING BATTERY COMPARTMENT CLOSURE THAT ALSO LOCKS FILM DOOR

[75] Inventor: Rolf Schröder, Baldham, Fed. Rep. of Germany

[73] Assignee: AGFA-Gevaert, A.G., Leverkusen, Fed. Rep. of Germany

[21] Appl. No.: 966,598

[22] Filed: Dec. 5, 1978

[30] Foreign Application Priority Data

Dec. 15, 1977 [DE] Fed. Rep. of Germany ... 7738283[U]
Oct. 13, 1978 [DE] Fed. Rep. of Germany ....... 2844728

[51] Int. Cl.$^2$ ...................... G03B 17/02; H01R 33/06
[52] U.S. Cl. .................................. 354/202; 339/152; 354/288
[58] Field of Search ........................ 354/288, 202, 126; 206/1.5; 220/212, 345, 346; 339/152

[56] References Cited

U.S. PATENT DOCUMENTS

| 988,191 | 3/1911 | Heidtmann | 206/1.5 |
|---|---|---|---|
| 2,099,122 | 11/1937 | Kreisler | 220/345 X |
| 2,585,191 | 2/1952 | Tresise et al. | 220/345 X |
| 3,629,793 | 12/1971 | Ettischer et al. | 354/126 X |
| 3,732,795 | 5/1973 | Fukuda et al. | 354/295 X |

FOREIGN PATENT DOCUMENTS

| 515051 | 1/1931 | Fed. Rep. of Germany | 339/152 |
|---|---|---|---|
| 619811 | 10/1935 | Fed. Rep. of Germany | 354/288 |
| 2803034 | 10/1978 | Fed. Rep. of Germany | 354/288 |

OTHER PUBLICATIONS

Kodak Research Disclosure, 5/75, p. 4.

Primary Examiner—L. T. Hix
Assistant Examiner—Shelley Wade
Attorney, Agent, or Firm—Michael J. Striker

[57] ABSTRACT

A still camera is provided with a battery compartment and with a film chamber, both of which are open at and are spaced lengthwise of, the rear side of the camera housing. A first cover is hinged to the camera housing so that it can pivot to a first position closing the chamber. A second cover is slidably mounted on the housing and movable to a second position in which it closes the battery compartment; when in this second position it engages the first cover and arrests it against movement out of the first position thereof. The inwardly facing side of the slidable second cover carries a sheetmetal contact having contact ribs which engage batteries in the compartment and complete a battery circuit only when the second cover is in its second (closure) position, but which interrupt the battery circuit when the second cover moves to its open position.

13 Claims, 4 Drawing Figures

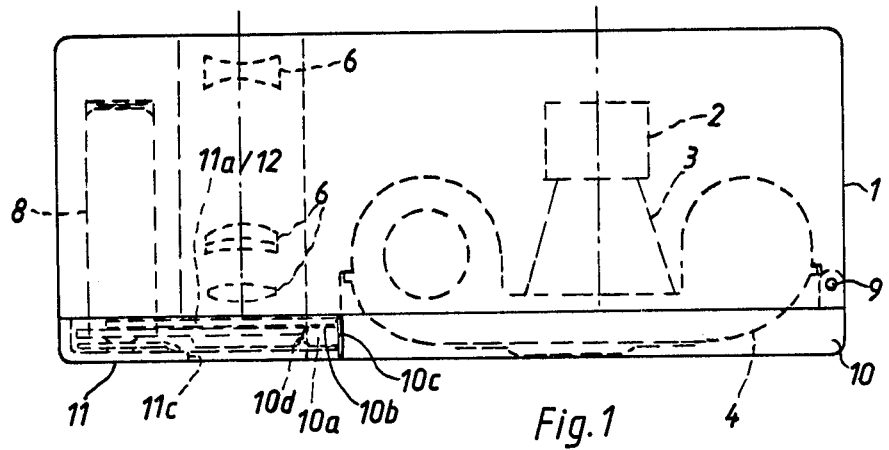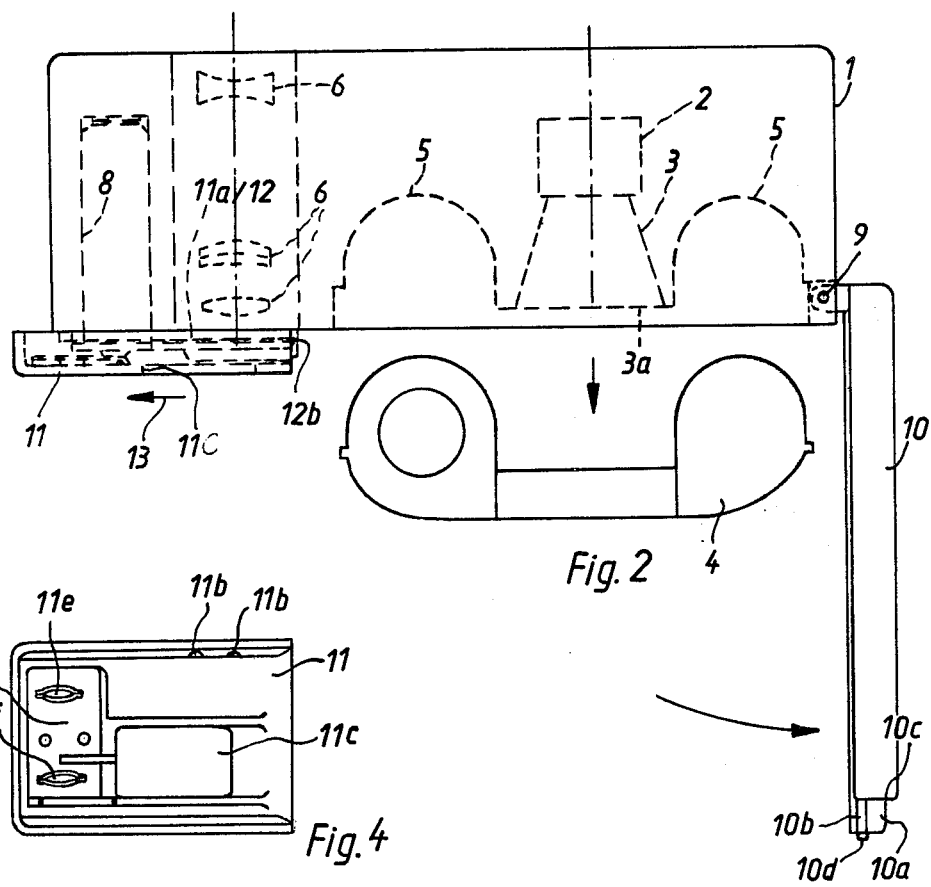

CONDUCTING BATTERY COMPARTMENT CLOSURE THAT ALSO LOCKS FILM DOOR

BACKGROUND OF THE INVENTION

1. Field of the Invention

This invention relates to cameras in general, and to still cameras in particular.

More especially, the invention relates to a still camera having different camera compartments and covers for the same.

2. The Prior Art

Still cameras are known from the prior art wherein a film compartment is closed by a hinged cover. To maintain these covers in closed position it is always necessary to provide a separate latching arrangement whose presence, given the large series in which especially the more inexpensive still cameras are produced, adds appreciably to overall production costs. Also, the presence of a separate latching element means one more item which can wear and/or malfunction.

SUMMARY OF THE INVENTION

It is an object of the present invention to provide a camera of the type discussed above, but wherein the need for a separate latching arrangement for the hinged cover is eliminated.

A more particular object of the invention is to provide such a camera as outlined above, wherein the hinged cover can be latched by using camera components which must anyhow be present on the camera.

Another object of the invention is to provide a camera having the characteristics outlined in the preceding paragraph, so that the space required in conventional constructions by separate latching arrangements, can be saved. This is an important consideration in many cameras, especially in the miniature cameras which are becoming more and more popular.

Most modern cameras have a flash arrangement, a film transporting motor and/or other electrically operated components. To power these components such cameras have a battery compartment containing one or more dry cells or rechargeable batteries. As a rule, the battery compartments are closed by a sliding cover which is opened when batteries are to be inspected or replaced. A problem which has been encountered in the prior art in such cameras is that while the sliding cover is open the batteries remain in circuit with the components which they power. This is undesirable because if, for example, the transporting motor is triggered while the cover is open and if the battery compartment itself is open to the interior of the camera (as is often the case), the film increment advanced by the motor may be exposed to incident light and be spoiled.

A further object of the invention therefore is to provide a still camera wherein this difficulty is avoided.

Particularly, it is an object to provide such a camera wherein the battery circuit is closed (i.e. operational) only when the sliding cover of the battery compartment is in its closed position.

Yet another object is to utilize, for the purpose of controlling the operational state of the battery circuit, components which are already present in the camera instead of requiring a separate arrangement for the control function.

In pursuance of the above objects, and of still others which will become apparent hereafter, one aspect of the invention resides in, a camera, in a combination comprising a housing having a film chamber and a battery compartment; a first cover hinged to the housing and movable to and from a first position in which it closes the film chamber; and a second cover slidably mounted on the housing for movement to and from a second position in which it closes the battery compartment and arrests the first cover in the first position thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a diagrammatic top plan view of a camera in accordance with the invention;

FIG. 2 is a view similar to FIG. 1, but showing the camera with its film chamber cover in open condition;

FIG. 4 is a rear view of the battery compartment cover of the camera in FIGS. 1-3.

DESCRIPTION OF PREFERRED EMBODIMENTS

Figure 3:
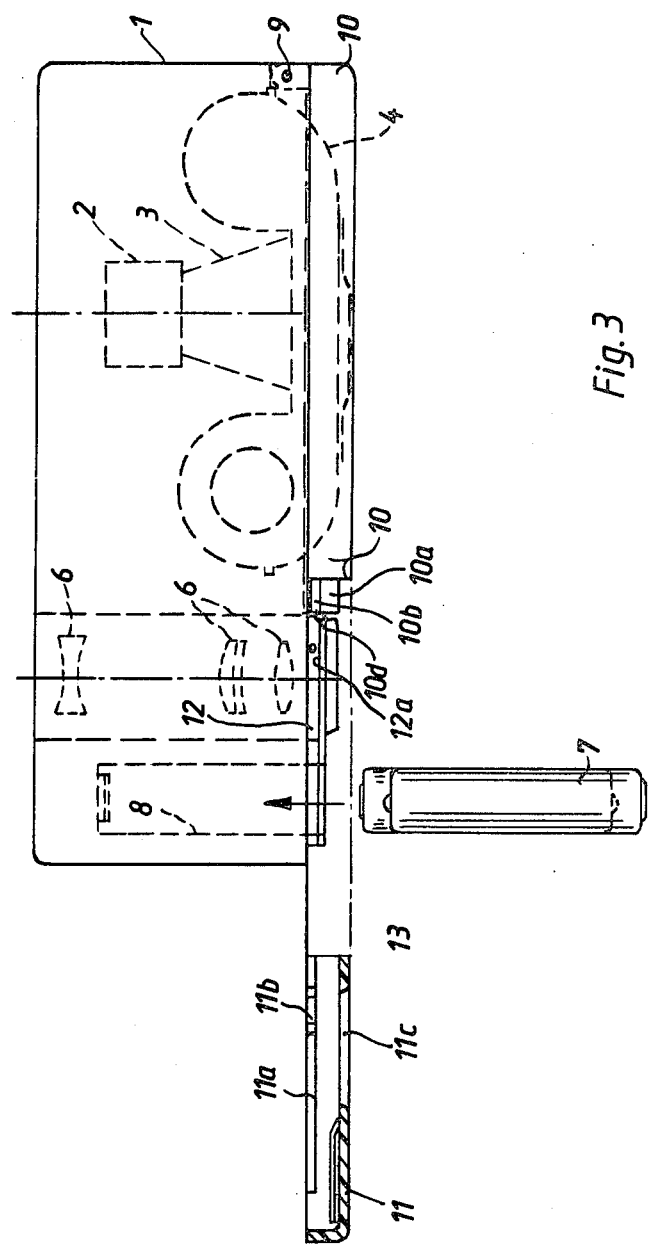
FIG. 3 also is a view similar to FIG. 1, but showing the camera with its battery compartment cover partly sectioned and in open condition.

The drawing shows in FIGS. 1-3 a still camera 1. Typically, this may (but need not) be one of the so-called "pocket cameras". The camera objective 2 is located at the outer end of a light guide 3 which extends to the film window 3a through which scene light focussed by the objective 2 is projected onto the film (not shown) in a cassette 4 (e.g. of the type 110) which is removably installed (see the arrow in FIG. 2) in the film chamber 5 of the camera. No attempt has been made to show how light reaches the objective 2, this being a conventional aspect which is known per se and forms no part of the invention. Laterally of the film chamber 5 the camera is provided with a diagrammatically shown viewfinder 6 and alongside the same with a battery compartment 8 for two or more batteries 7 which in the illustrated embodiment should be understood to be located one above the other (hence only one is visible in FIG. 3).

A cover 10 for the film chamber 5 is pivoted to the camera housing at 9; it is just long enough to cover the chamber 5 and its free end is stepped (recessed) at 10a. The inner side of cover 10 is provided with grooves 10b adjacent the upper and lower cover edges. The battery compartment 8, on the other hand, is closed by a sliding cover 11 which is provided with ribs 11a. These are received in grooves 12 formed in the rear side of the camera housing and extending along the compartment 8 and the viewing opening of the viewfinder 6. The grooves 12 are so positioned that they are aligned with the grooves 10b of cover 10 when the latter is in its closed position (FIG. 1); thus, grooves 10b constitute an extension of the grooves 12.

The cover 10 can be arrested in its closed position without requiring a separate latching arrangement for this purpose. It is simply necessary to move the cover 10 from open (FIG. 2) to closed (FIG. 1) position and thereafter to shift the cover 11 (to the right in FIG. 1) until its ridges extend in part into the grooves 10b.

There is no guessing involved for the user, since he merely slides cover 11 until the same abuts the edge 10c of cover 10.

Cover 11 should not be slidable too easily, since it might otherwise come open by itself (e.g. when the camera is inclined). To prevent this, one or both of the grooves 12 may be provided on respective boundary surfaces thereof with slight projections 12a and one or both of the ridges 11a may be provided with corresponding dimples (recesses) 11b into which the projections 12a snap when the cover 11 is moved to its closed position. Evidently, this relationship could be reversed or replaced with analogous means, e.g. the contacting surfaces of the ribs and grooves could be roughened. In an analogous manner provision can be made to keep the cover 11 from accidentally swinging open when the cover 11 is either moved to open position or entirely removed. For this purpose the end of the cover portion 10a may have one or more small projections 10d which cooperate in snap fashion with corresponding dimples 12b formed in the camera housing adjacent the open ends of the grooves 12.

When the cover 11 is in its closed position it extends not only across the open side of the battery compartment 8, but also across the viewing window of the viewfinder 6. Since the viewing window evidently must not be blocked, that portion of the cover 11 which in the closed position of this cover extends across the viewing window of the viewfinder, is provided with an opening 11c.

To change the cassette 4 in the camera 1, the cover 11 is shifted in the direction of arrow 13 (FIG. 2) until it disengages the portion 10a of cover 10. The cover 10 can then be pivoted to the open position of FIG. 2 (disengaging the snap detents 10d, 12b if such are provided) and the cassette 4 removed (see the arrow in FIG. 2) and replaced with a new one. The cover 10 is then returned to closed position (in which the detents 10d, 12b reengage one another) and cover 11 is shifted to the right until it abuts the end 10c (FIG. 1).

To inspect or replace one or more of the batteries 7, the cover 11 is shifted in the direction of arrow 13 until the battery compartment 8 is exposed and batteries may be removed or installed. Although the cover 10 is at this time not arrested by the cover 11, the detents 10d, 12b serve to hold it in closed position. Additionally the user may exert pressure on the cover 10 as a safety measure. When servicing of the batteries is completed, the cover 11 is shifted to the right until it abuts the end 10c of portion 10a.

To be certain that the battery circuit is interrupted when cover 11 is open (so that no accidental energization of the not illustrated electrical or electronic components of the camera can take place), the inwardly facing side of cover 11 is provided (see FIG. 4) with an electrically conductive contact 11d (of e.g. sheet metal) which is provided with two contact ribs 11e and 11f. It is advantageous if these ribs are in form of slits embossed into the contact 11d, so that they have sharp edges at the inner side of the contact. Such sharp edges assure excellent electrical contact with the batteries 7, since the formation of deposits hindering the flow of electricity is very difficult or even impossible on these sharp edges.

When the cover 11 is in the position shown in FIG. 1, each of the ribs 11e and 11f makes electrical contact with one of the batteries 7, thus completing the battery circuit through the contact 11d and rendering the electrical or electronic camera components operative. On the other hand, movement of the cover 11 to the position of FIG. 2 or to that of FIG. 3, causes the ribs 11e, 11f to disengage the batteries 7 so that the battery circuit is interrupted and operation of the electrical or electronic components is impossible until the cover 11 is restored to its closed position.

While the invention has been illustrated and described as embodied in a still camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a camera, particularly a still camera, a combination comprising a housing having a film chamber and a battery compartment; a first cover hinged to said housing and movable to and from a first position in which it closes said film chamber; and a second cover slidably mounted on said housing for movement between a second position in which it closes said battery compartment and makes electrical contact with batteries in said battery compartment while arresting said first cover in said first position thereof, a latched third position in which it at most partially exposes said battery compartment and breaks said electrical contact while disengaging said first cover for movement of the same from said first position, and a fourth position in which said second cover fully exposes said battery compartment for access to the batteries therein.

2. A combination as defined in claim 1, wherein said housing is elongated and has two spaced end portions, said film chamber and said battery compartment being provided in said housing spaced along one side thereof which extends in the direction of elongation of said housing, and wherein said first cover is hinged to one of said end portions and said second cover is provided at the other of said end portions.

3. A combination as defined in claim 1, said first cover having a terminal portion which is located proximal to said second cover when said first cover is in said first position thereof, said terminal portion having at least one groove, and wherein said second cover has at least one rib which engages in said groove when said covers are in the respective first and second positions thereof.

4. A combination as defined in claim 1, said housing having portions bounding an open side of said battery compartment and provided with grooves extending along said open side, and wherein said second cover has ribs slidable in said grooves.

5. A combination as defined in claim 4, said first cover having additional grooves which are aligned with and form extensions of said grooves of said housing portions when said first cover is in said second position thereof, so that said ribs of said second cover become partly located in said additional grooves when said second cover is in said second position thereof.

6. A combination as defined in claim 5; further comprising cooperating snap detent means on surfaces bounding the first-mentioned grooves and said ribs, respectively.

7. A combination as defined in claim 6, said snap detent means comprising cooperating projections and depressions.

8. A combination as defined in claim 5; further comprising cooperating snap detent means on said housing portions and said first cover, respectively.

9. A combination as defined in claim 7, said snap detent means comprising cooperating projections and depressions.

10. A combination as defined in claim 1, said second cover having an inner side facing said battery compartment and provided with an electrically conductive contact member which makes said electrical contact with batteries in said compartment when said second cover moves to said second position, and which breaks electrical contact with such batteries when said second cover moves out of said second position.

11. A combination as defined in claim 10; and further comprising means for retaining said second cover at least in said second position thereof.

12. A combination as defined in claim 10, said contact member being a sheet-metal member having contact ribs which project in direction inwardly toward said battery compartment.

13. A combination as defined in claim 12, said ribs being incised in said sheet-metal member and having sharp contact edges for contact with batteries in said battery compartment.

* * * * *